(12) United States Patent
Elshafiy et al.

(10) Patent No.: US 11,533,104 B2
(45) Date of Patent: Dec. 20, 2022

(54) SYSTEM AND METHOD FOR PROVIDING BEAM PLANNING FOR INTERFERENCE-AWARE SATELLITE BEAM PATTERN DESIGN

(71) Applicant: Samsung Electronics Co., Ltd., Gyeonggi-do (KR)

(72) Inventors: Ahmed Elshafiy, Goleta, CA (US); Hyukjoon Kwon, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/846,463

(22) Filed: Apr. 13, 2020

(65) Prior Publication Data

US 2021/0234606 A1 Jul. 29, 2021

Related U.S. Application Data

(60) Provisional application No. 62/966,849, filed on Jan. 28, 2020.

(51) Int. Cl.
*H04B 7/185* (2006.01)
*H04B 7/204* (2006.01)

(52) U.S. Cl.
CPC ....... *H04B 7/1855* (2013.01); *H04B 7/18543* (2013.01); *H04B 7/18563* (2013.01); *H04B 7/2041* (2013.01)

(58) Field of Classification Search
CPC ... H04W 16/28; H04B 7/2041; H04B 7/0695; H04B 7/18521; H04B 7/18589; H01Q 1/288

See application file for complete search history.

(56) References Cited

U.S. PATENT DOCUMENTS

| 4,626,864 | A  | * | 12/1986 | Micklethwaite | ......... | H01Q 3/04 |
|---|---|---|---|---|---|---|
| | | | | | | 248/183.2 |
| 6,229,482 | B1 | | 5/2001 | Vaughan | | |
| 6,940,452 | B2 | | 9/2005 | Munoz et al. | | |
| 8,218,476 | B2 | | 7/2012 | Miller | | |
| 8,406,701 | B2 | | 3/2013 | Singh et al. | | |
| 8,655,410 | B2 | | 2/2014 | Senarath et al. | | |
| 8,744,360 | B2 | | 6/2014 | Zhong et al. | | |
| 10,135,126 | B2 | | 11/2018 | Diamond et al. | | |
| 2005/0068230 | A1 | * | 3/2005 | Munoz | ................... | H01Q 25/00 |
| | | | | | | 342/359 |
| 2005/0085186 | A1 | | 4/2005 | Sandvin | | |
| 2007/0258511 | A1 | * | 11/2007 | Knight | ................... | H04B 1/707 |
| | | | | | | 375/149 |
| 2010/0123621 | A1 | | 5/2010 | Craig et al. | | |
| 2014/0099978 | A1 | * | 4/2014 | Egner | ................... | H04W 4/029 |
| | | | | | | 455/456.6 |

(Continued)

FOREIGN PATENT DOCUMENTS

WO  WO 2016/160487  10/2016

*Primary Examiner* — Ayaz R Sheikh
*Assistant Examiner* — Debebe A Asefa
(74) *Attorney, Agent, or Firm* — The Farrell Law Firm, P.C.

(57) ABSTRACT

A method and system for mitigating inter-satellite interference are provided. The method includes modifying a beam bore-sight of a satellite according to a hexagonal mapping, identifying beams of the satellite positioned outside of the hexagonal mapping, and reducing power of the beams positioned outside of the hexagonal mapping.

20 Claims, 10 Drawing Sheets

(56) References Cited

U.S. PATENT DOCUMENTS

| | | | |
|---|---|---|---|
| 2015/0236772 A1* | 8/2015 | Hammarwall | H04B 7/0617 370/329 |
| 2016/0323705 A1* | 11/2016 | Murphy | H04W 64/00 |
| 2016/0380692 A1* | 12/2016 | Jalali | H04W 16/28 455/11.1 |
| 2017/0019814 A1* | 1/2017 | Determan | H04B 7/18513 |

* cited by examiner

SYSTEM AND METHOD FOR PROVIDING BEAM PLANNING FOR INTERFERENCE-AWARE SATELLITE BEAM PATTERN DESIGN

PRIORITY

This application is based on and claims priority under 35 U.S.C. § 119(e) to a U.S. Provisional patent application filed on Jan. 28, 2020 in the United States Patent and Trademark Office and assigned Ser. No. 62/966,849, the entire contents of which are incorporated herein by reference.

FIELD

The present disclosure is generally related to non-terrestrial networks (NTN), and more particularly, to mitigating interference at the edge of the satellite coverage areas, by adjusting the beam design pattern.

BACKGROUND

In NTNs, a constellation of satellites is used to provide coverage around the world. Each satellite has a set of beams to support users located on Earth's surface. Their service regions on Earth's surface, called beam footprints, can be mildly overlapped when multiple satellite operate together. This could occur, specifically, at the edge of the satellite coverage areas, as non-flat surfaces on Earth cause more prolongation of the beam at the edge. As a consequence, this causes heavy interference in the service areas of neighboring satellites.

The baseline methodology for satellite beam placement is to place the beam in a hexagonal grid on a UV plane. The UV plane may be referred to as a projection of a unit sphere centered at a satellite at a satellite local coordinate system, as defined in the $3^{rd}$ Generation Partnership Project (3GPP) technical report (TR) 38.321. The letters "U" and "V" denote the axes of the 2D texture because "X", "Y", and "Z" are already used to denote the axes of the 3D object in model space, while "W" (in addition to XYZ) is used in calculating quaternion rotations, a common operation in computer graphics. Such a beam placement methodology results in high inter-satellite interference towards the corners of the single-satellite coverage area.

SUMMARY

According to one embodiment, a method for mitigating inter-satellite interference is provided. The method includes modifying a beam bore-sight of a satellite according to a hexagonal mapping, identifying beams of the satellite positioned outside of the hexagonal mapping, and reducing power of the beams positioned outside of the hexagonal mapping.

According to one embodiment, a system for mitigating inter-satellite interference is provided. The system includes at least one satellite, a memory, and a processor configured to modify a beam bore-sight of the at least one satellite according to a hexagonal mapping, identify beams of the at least one satellite positioned outside of the hexagonal mapping, and reduce power of the beams positioned outside of the hexagonal mapping.

According to one embodiment, a method for mitigating inter-satellite interference is provided. The method includes initializing beam bore-sight locations of a satellite in a predetermined area, partitioning the area into boundary regions, optimizing beam bore-sight locations within each boundary region, and shifting the initialized beam bore-sight locations to the optimized beam bore-sight locations.

According to one embodiment, a system for mitigation inter-satellite interference is provided. The system includes at least one satellite, a memory, and a processor configured to initialize beam bore-sight locations of the at least one satellite in a predetermined area, partition the area into boundary regions, optimize beam bore-sight locations within each boundary region, and shift the initialized beam bore-sight locations to the optimized beam bore-sight locations.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

Figure 1:
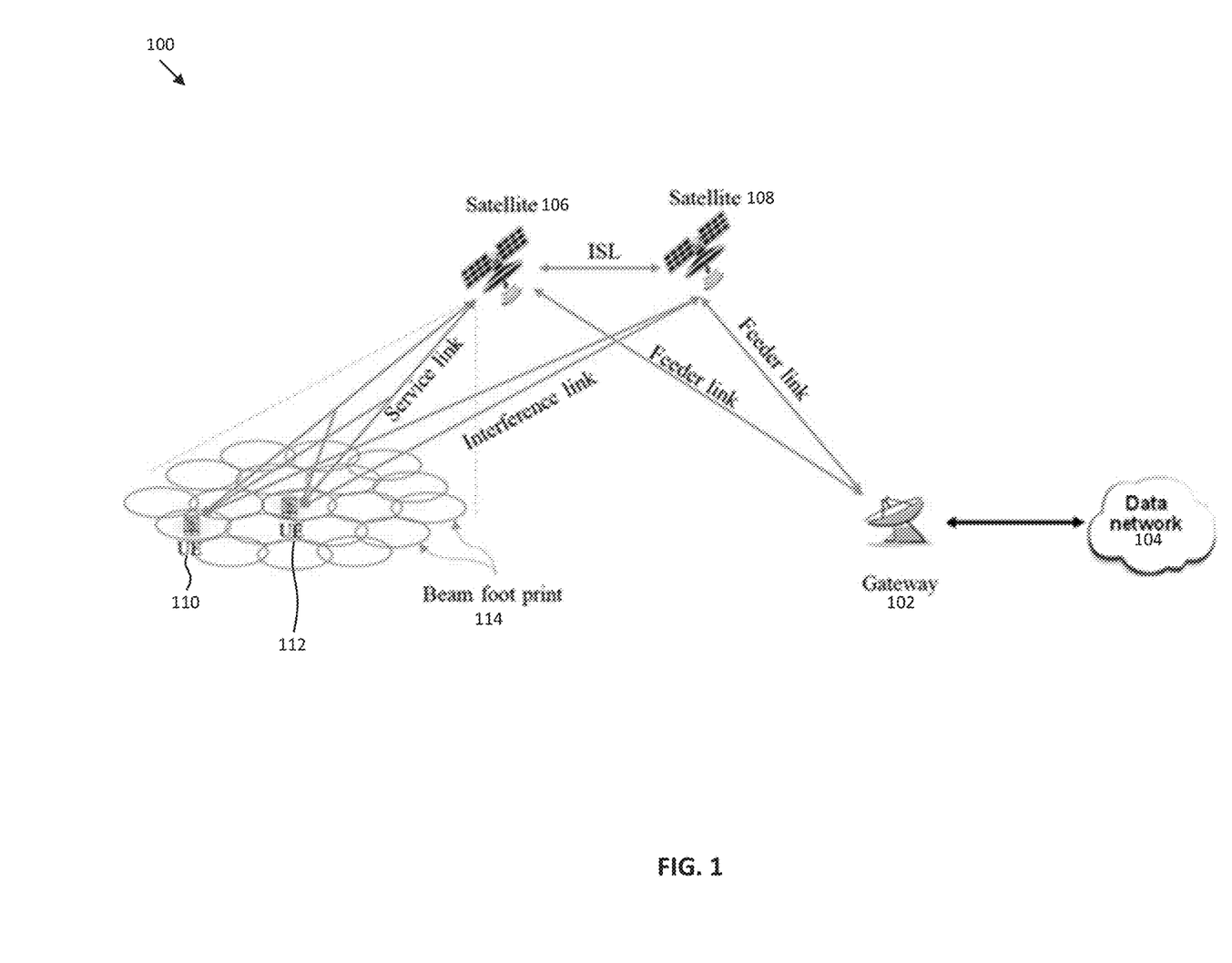
FIG. 1 illustrates a diagram of a scenario in an NTN, according to an embodiment.

FIG. 1 illustrates a diagram of a scenario in an NTN, according to an embodiment. FIG. 1 depicts a satellite serving a user equipment (UE) with its beam foot print pattern. The NTN 100 includes a gateway 102 connected with a data network 104. The gateway 102 feeds the satellites 106 and 108 with a feeder link. UEs 110 and 112 are positioned within the beam foot print 114. The satellite 106 attempts to provide a service link to the UEs 110 and 112, while the satellite 108 causes interference links to be sent to the UEs 110 and 112.

The present system and method provide adjustment of satellite beam power, especially located at the edge of the coverage area. The adjusted power level per beam includes zero power (i.e., turning the beam off), meaning shutting down a subset of beams. By adjusting the power level, inter-satellite interference may be mitigated and acceptable coverage may be maintained.

The present system and method provide a maximized signal-to-interference ratio (SIR) by redistributing the beam bore-sight directors. The beam bore-sight direction may be adjusted so that the beam bore-sight direction is non-uniformly distributed. Under this principle, iteratively finding the optimal bore-sight beam directions to maximize average SIR on the Earth surface is possible.

The present system and method provide improved inter-satellite beam pattern design by applying power control to the satellite beams and to adjust the beam coverage and/or redesigning the satellite beam bore-sights layout such that the union of the beam footprints forms a convex area, and the SIR is maximized, and/or redesigning the satellite beam bore-sights layout to maximize the minimum area of the beam coverage where both beam powers from the serving satellites and the interference satellites are the same.

The present system and method provide a maximized minimum area of the beam coverage with a beam boundary of SIR=0 dB. The beam boundary is considered at the region where SIR is 0 dB (i.e., where the serving beam and the interference beam have the same power). The beam coverage depends on the distribution of the beam bore-sights and their relative power region up to SIR=0 dB. As the minimum beam coverage area with SIR=0 dB beam boundary is maximized, the minimum efficiency even in the region of interference may be maximized.

Figure 2:
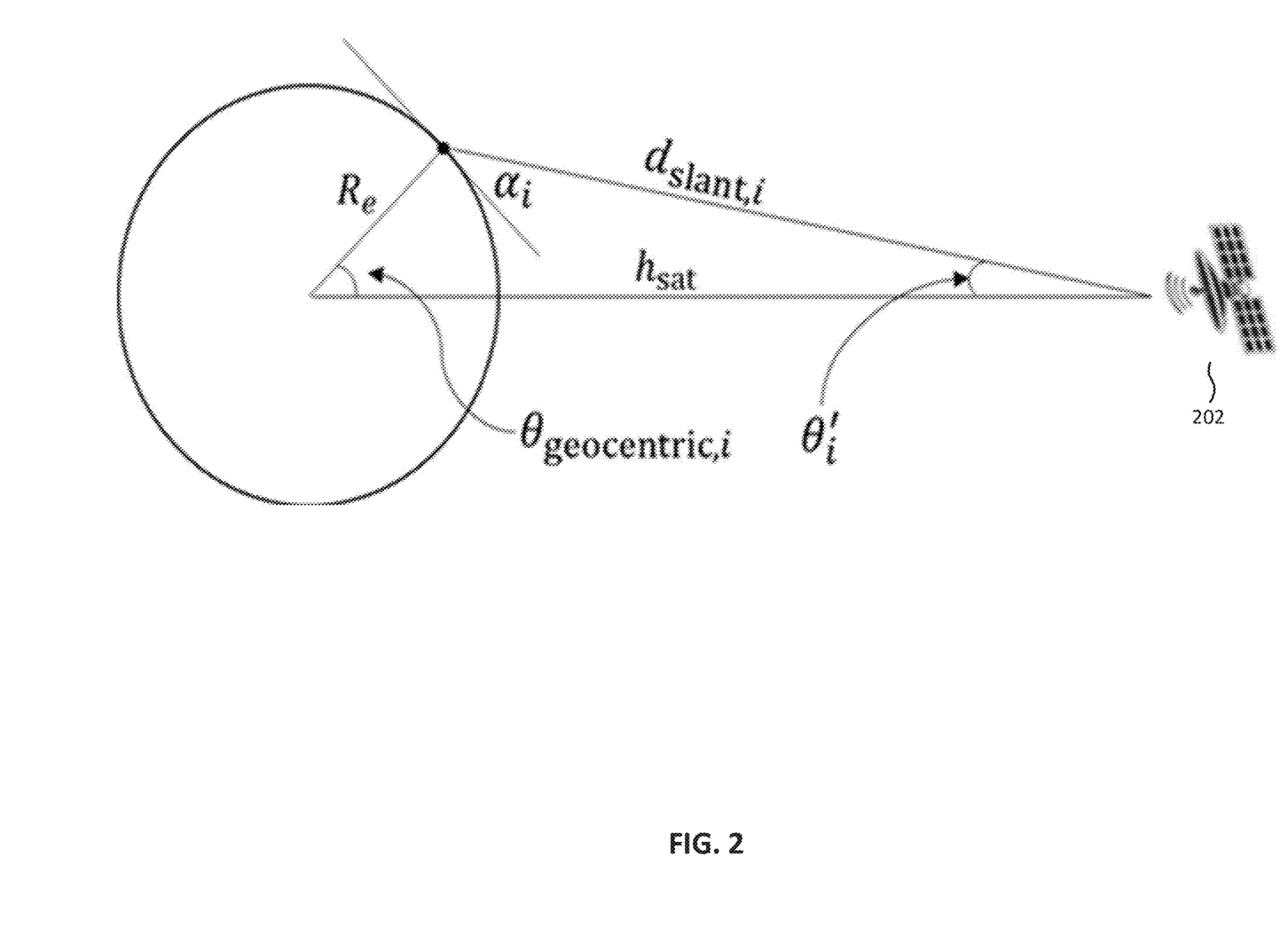
FIG. 2 illustrates a diagram of a beam pattern on a UV plane, according to an embodiment.

FIG. 2 illustrates a diagram of a beam pattern on a UV plane, according to an embodiment. The UV plane is a projection of a unit sphere centered at the satellite 202 location in the local coordinate system (LCS) of the satellite 202. The UV plane may represent the local antenna domain at the satellite 202.

Figure 3:
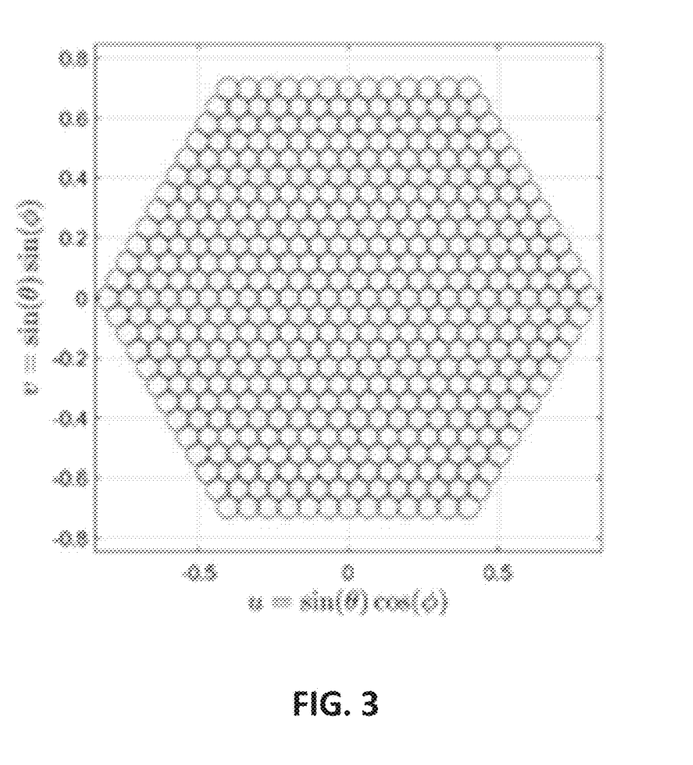
FIGS. 3 and 4 illustrate diagrams of beam patterns, according to an embodiment.
Figure 4:
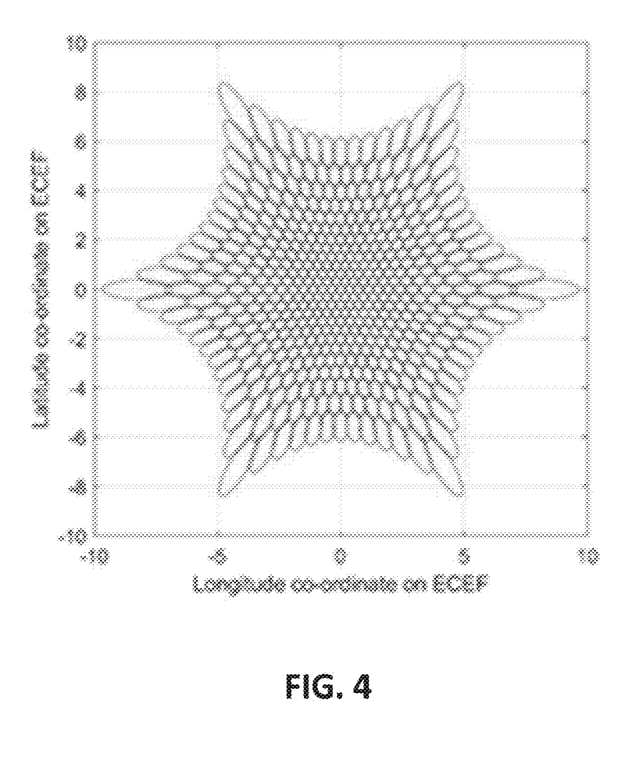

FIGS. 3 and 4 illustrate diagrams of beam patterns, according to an embodiment. In the UV plane, a satellite may design a beam pattern as shown in FIG. 3. FIG. 3 shows hexagonal mapping of the beams' boresight directions on the UV plane, and the corresponding 3 dB beam foot prints. The example plot shown in FIG. 3 assumes 469 beams per satellite, low Earth orbit (LEO)-600 km orbit altitude, and 90 degrees central beam elevation angle. However, on the Earth's surface in the Earth-coordinate Earth fixed (ECEF) coordinate, the actual beam layout is changed as shown in FIG. 4.

Figure 5:
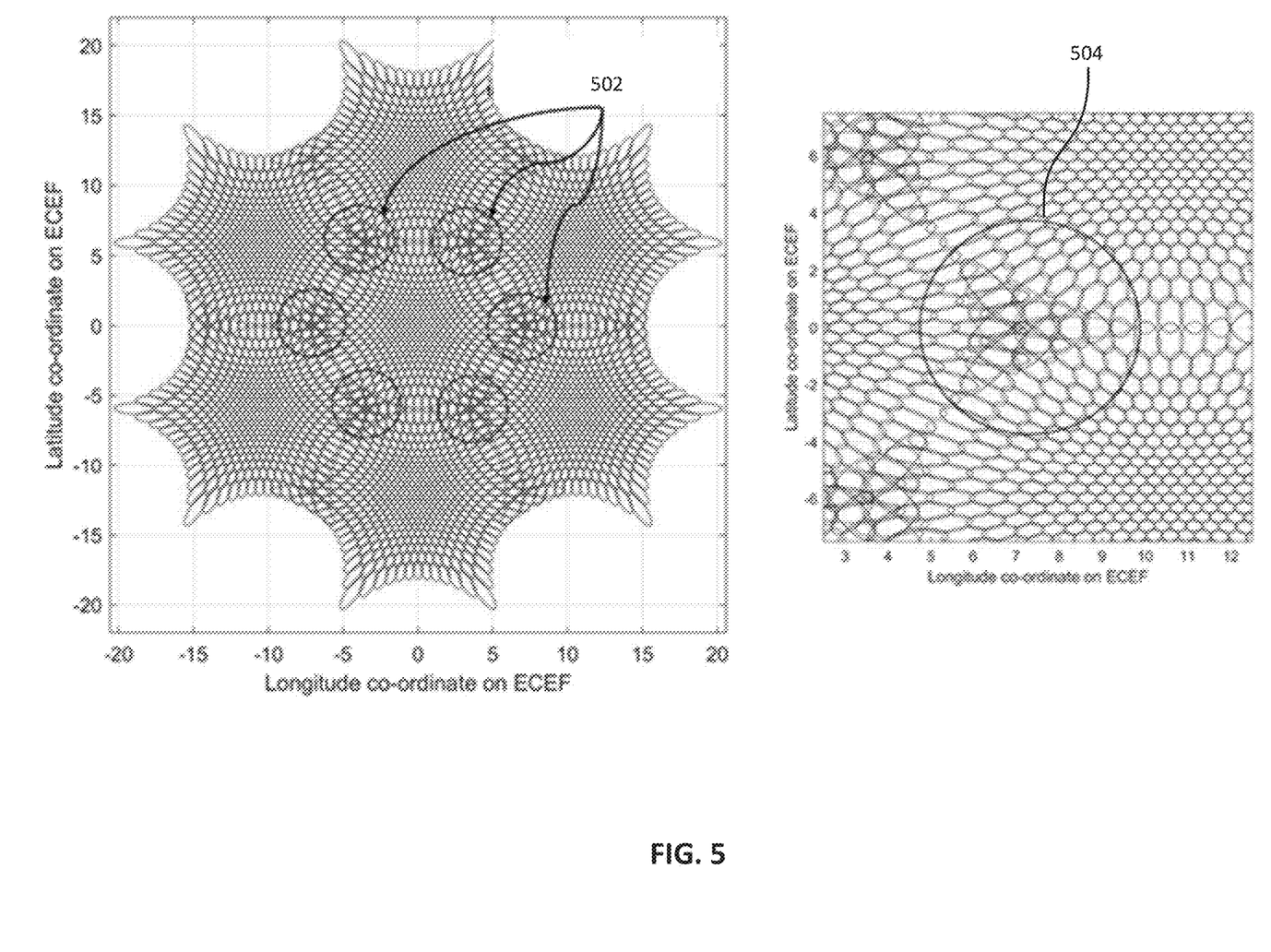
FIG. 5 illustrates a diagram of a beam foot print on the Earth's surface for a multi-satellite case, according to an embodiment.

FIG. 5 illustrates a diagram of a beam foot print on the Earth's surface for a multi-satellite case, according to an embodiment. When multiple satellites operate, the overlapped beam layout shown at 502 and 504 causes high interference at the edge of beam coverage. FIG. 5 shows edge beam overlap across satellite coverage areas for frequency re-use factor=1 (left-most) and frequency re-use factor=3 (right-most). It may be noted that receivers served by edge beams may suffer from relatively lower signal power due to larger signal propagation distances, hence mitigation of high inter-satellite interference is desired. Without loss of generality, the inter-satellite interference for a single transmit digital port and a single receive digital port can be written as Equation (1):

$$I_{inter}^i(f_r, t) = \sum_{j \neq j^*(i)} \sum_w \frac{P_{tx}^{j,w}|h_{i,j,w}(f_r, t)|^2 SF_j}{PL_j}, \quad (1)$$

where i is the user index, j is the satellite index, w is the beam index, $j^*(i)$ is the serving satellite index as a function of user i, and $P_{tx}^{j,w}$ is the power allocated to the w-th beam in the j-th satellite. $h_{i,j,w}(f_r, t)$ is the complex channel coefficient at time t and sub-carrier frequency $f_r$. $SF_j$ is the shadow fading in linear scale, and $PL_j \geq 1$ is the path loss in linear scale. Consequently, the intra-satellite interference and the signal to interference plus noise ratio can be written as Equations (2), (3), and (4):

$$I_{intra}^i(f_r, t) = \sum_{w \neq w^*(i)} \frac{P_{tx}^{j^*(i),w}|h_{i,j^*(i),w}(f_r, t)|^2 SF_{j^*(i)}}{PL_{j^*(i)}} \quad (2)$$

$$SINR^i(f_r, t) = \frac{S(f_r, t)}{I_{inter}^i(f_r, t) + I_{intra}^i(f_r, t) + \sigma_n^2} \quad (3)$$

$$SINR^i(f_r, t) = \frac{\left(\frac{P_{tx}^{j^*(i),w^*(i)}|h_{i,j^*(i),w^*(i)}(f_r, t)|^2 SF_{j^*(i)}}{PL_{j^*(i)}}\right)}{\left(\sum_{j \neq j^*(i)} \sum_w \frac{P_{tx}^{j,w}|h_{i,j,w}(f_r, t)|^2 SF_j}{PL_j} + \sum_{w \neq w^*(i)} \frac{P_{tx}^{j^*(i),w}|h_{i,j^*(i),w}(f_r, t)|^2 SF_{j^*(i)}}{PL_{j^*(i)}} + \sigma_n^2\right)} \quad (4)$$

where $w^*(i)$ is the serving beam index, and $\sigma_n^2$ is the noise power. The focus herein is on reducing the inter-satellite interference $I_{inter}^i(f_r, t)$ by manipulating the beam transmit power $P_{tx}^{j,w}$.

Figure 6:
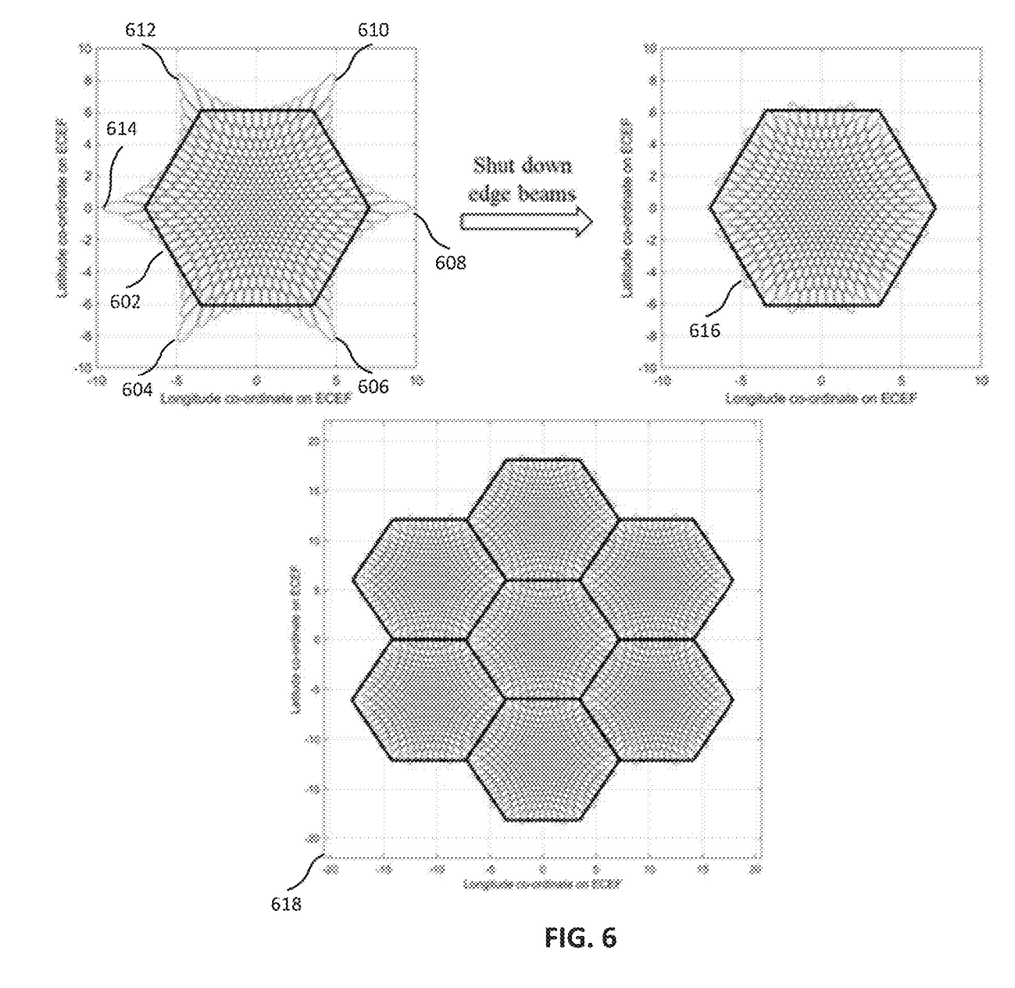
FIG. 6 illustrates a diagram of coverage areas, according to an embodiment.

FIG. 6 illustrates a diagram of coverage areas, according to an embodiment. In one embodiment, the present system and method modifies the union of the satellite coverage area into a hexagonal shape and shuts down beams (i.e., zero-power beams) located outside the hexagon. For example, referring to FIG. 6, the system imposes a hexagonal shape 602 on the coverage area, and removes the beams 604-614 located outside the hexagonal shape 602, as shown in 616. The modified coverage area shown in 616 can be combined with other modified areas, as shown in 618 to reduce overall interference within the entire coverage area 618.

Beams that have a large percentage of the foot print (e.g., a percentage that exceeds a threshold) outside the hexagonal shaped coverage area are shut down. In this case, the area that is not covered with 3 dB beam foot print is minimized, while reducing the inter-satellite interference. Additionally, the present system may optimize the edge beam power rather than shutting down the beam completely. For example, the beam power may be assigned such that it is inversely proportional to foot print area outside the hexagonal coverage space. With $0 \leq a_{j,w} \leq 1$ being the area fraction of the 3 dB beam foot print that is outside the hexagon coverage space, $a_{j,w}$ can be calculated numerically. Additionally, with $\mathcal{W}_j$ being the set of edge beams which have a large percentage of the foot print outside the hexagonal shaped coverage area, such as in Equation (5):

$$\mathcal{W}_j = \{w: a_{j,w} \geq A_T\}, \quad (5)$$

where $A_T$ is the area threshold, the hard decision solution that corresponds to shutting the edge beams off results in Equation (6).

$$P_{tx}^{j,w} = \begin{cases} 0 & w \in W_j \\ P_{tx} & w \notin W_j \end{cases}. \quad (6)$$

One possibility of the soft decision solution results in Equation (7).

$$P_{tx}^{j,w} = P_{tx}(1 - a_{j,w}) \quad (7)$$

Figure 7:
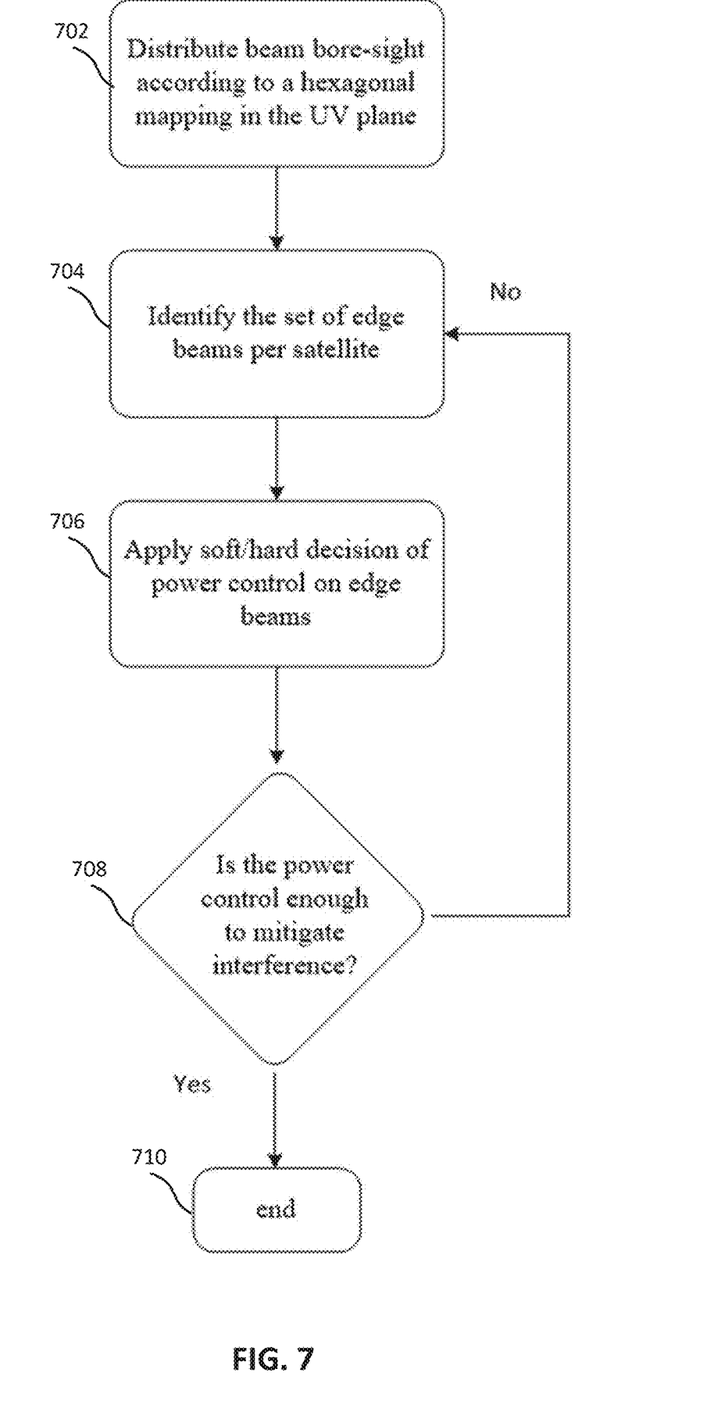
FIG. 7 illustrates a flowchart 700 for a method for mitigating inter-satellite inference, according to an embodiment.

FIG. 7 illustrates a flowchart 700 for a method for mitigating inter-satellite inference, according to an embodiment. At 702, the system distributes beam bore-sights according to a hexagonal mapping in the UV plane. At 704, the system identifies a set of edge beams per satellite. At 706, the system applies a soft/hard decision of power control on the edge beams. At 708, the system determines whether the power control is enough to mitigate the inter-satellite interference. If the power control is not enough, the system repeats steps 704-708. If the power control is enough to mitigate the inter-satellite interference, the system ends the process at 710.

The present system and method provide interference-aware beam pattern designs by redistributing the boresight directions such that the average SIR across the hexagonal shaped coverage area is maximized. This can be achieved by employing codebook design techniques from the vector quantization literature such as the generalized Lloyd algorithm (GLA) or deterministic annealing (DA). The beam bore-sight direction can be optimized iteratively using GLA or DA for a given set of data points (users' locations on the longitude-latitude plane). The users are expected to be uniformly distributed on the Earth's surface. Hence, with $\Omega_i = [\theta_i, \phi_i]^T$ being the latitude and longitude angles' vector of the i-th data point, where the data points are generated using the uniform distribution assumption in the single-satellite coverage area and $\psi_j = [\vartheta_j, \varphi_j]^T$ being the j-th beam bore-sight location in the latitude-longitude plane, a single GLA iteration can be written as in Equation (8):

$$\mathcal{S}_j = \{i: f(\Omega_i, \psi_j) \geq f(\Omega_i, \psi_k) \forall k \neq j\} \quad (8)$$

where $\mathcal{S}_j$ is the set of data points associated with the j-th satellite beam, and $f(\Omega_i, \psi_j)$ is the objective function calculated if the i-th data point is assigned to the j-th satellite beam. Equation (8) represents the first step known as the clustering rule, which associates data points with the satellite beam that maximizes the objective function. One possibility of the objective function is the SIR.

Figure 8:
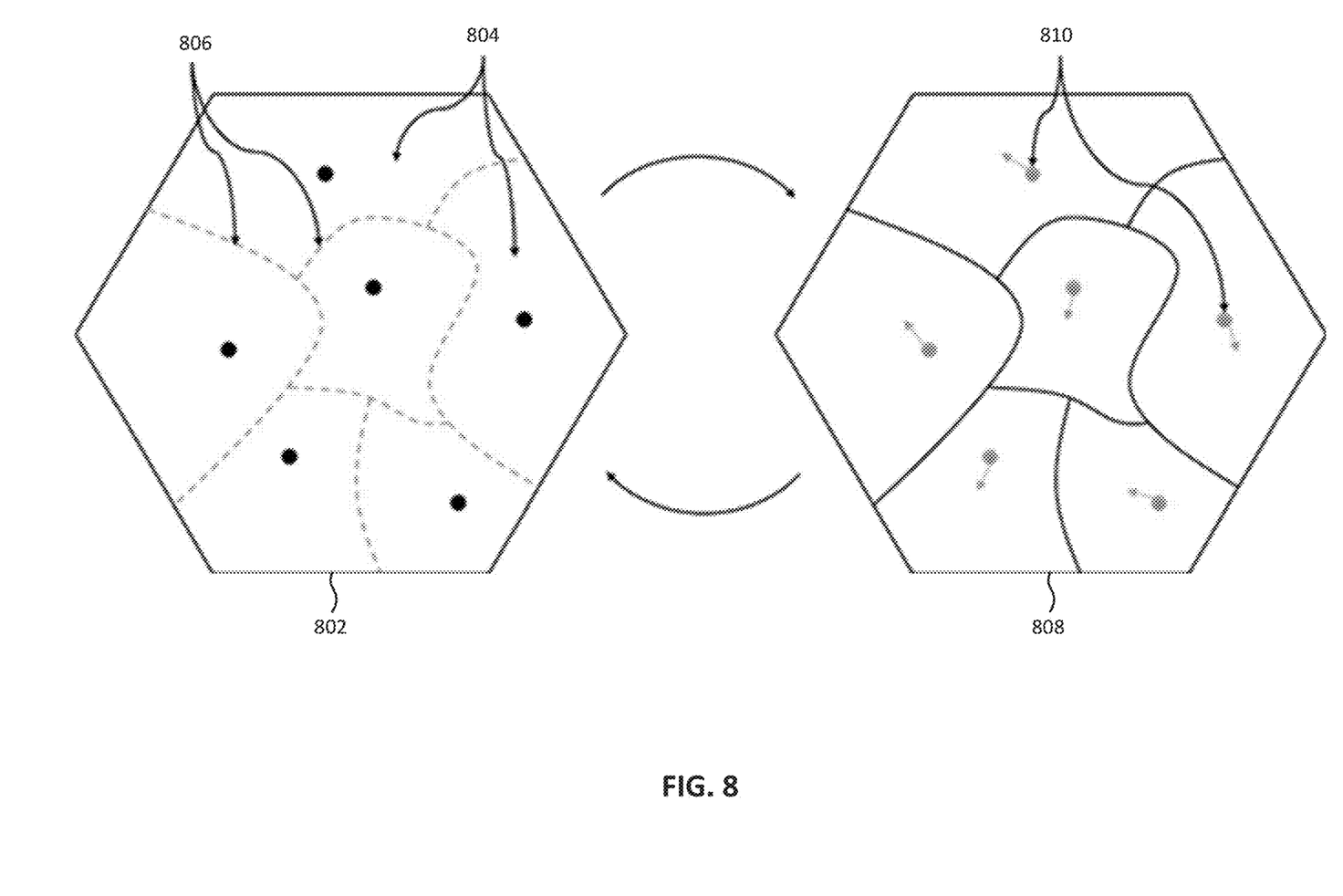
FIG. 8 illustrates a diagram of a clustering and centroid rule, according to an embodiment.

FIG. 8 illustrates a diagram of a clustering and centroid rule, according to an embodiment. The clustering step is shown at 802, which is equivalent to partitioning the space into boundary regions $\{\mathcal{S}_j\}$ 804 and drawing the boundary lines 806.

The beam-boresight locations may be optimized such that the average of objective functions is maximized as in Equation (9).

$$\psi_j = \underset{\psi_j}{\operatorname{argmax}} \frac{1}{|S_j|} \sum f(\Omega_i, \psi_j). \quad (9)$$

The optimization of beam-boresight locations, also called the centroid rule, is shown in 808, where the beam-boresight locations (i.e., boresight 810) are shifted according to the optimization in Equation (9). The GLA may repeat the clustering rule and the centroid rule iteratively until convergence.

Figure 9:
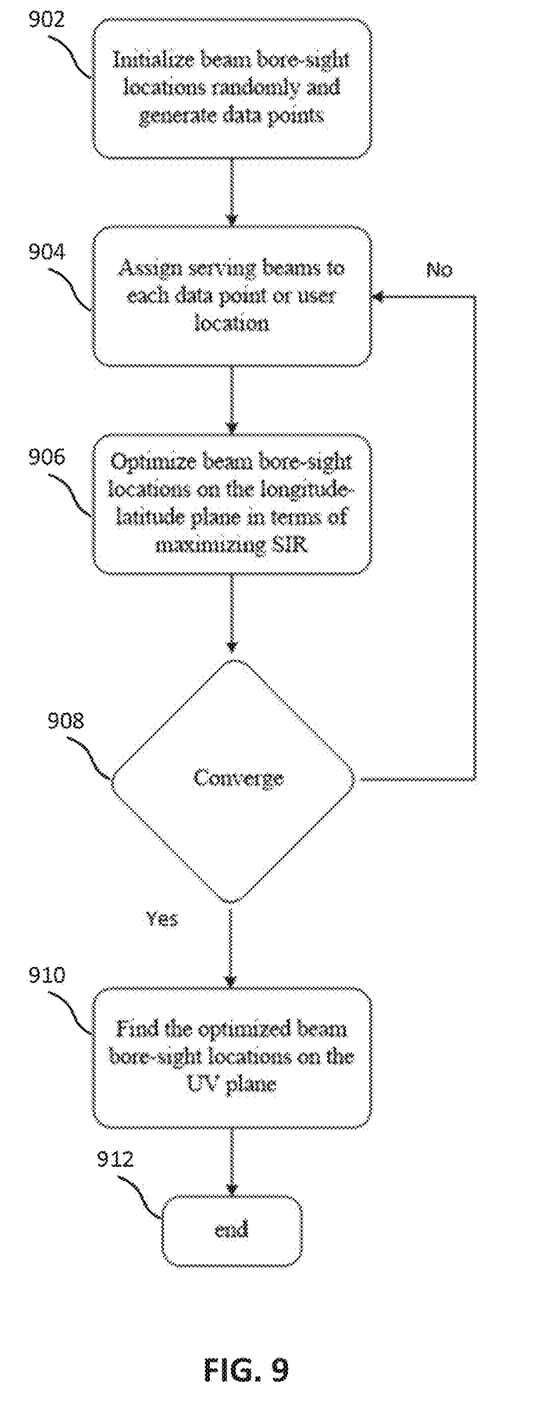
FIG. 9 illustrates a flowchart for optimizing bore-sight locations, according to an embodiment.

FIG. 9 illustrates a flowchart for optimizing bore-sight locations, according to an embodiment. At 902, the system initializes beam bore-sight locations randomly and generates data points. At 904, the system assigns serving beams to each data point or user location. At 906, the system optimizes beam bore-sight locations on the longitude-latitude plane in terms of maximizing SIR. At 908, the system determines whether convergence has occurred. If the converges has not occurred, the system repeats steps 904-908. If the system determines convergence has occurred, then at 910, the system finds the optimized beam bore-sight locations on the UV plane. At 912, the system ends the process.

The present system and method provide interference-aware beam pattern designs by maximizing the minimum area of the beam coverage where the beam boundary is set to be at SIR=0 dB. The similar steps of clustering and centroid rules above may be applied iteratively as described above with a different metric.

Figure 10:
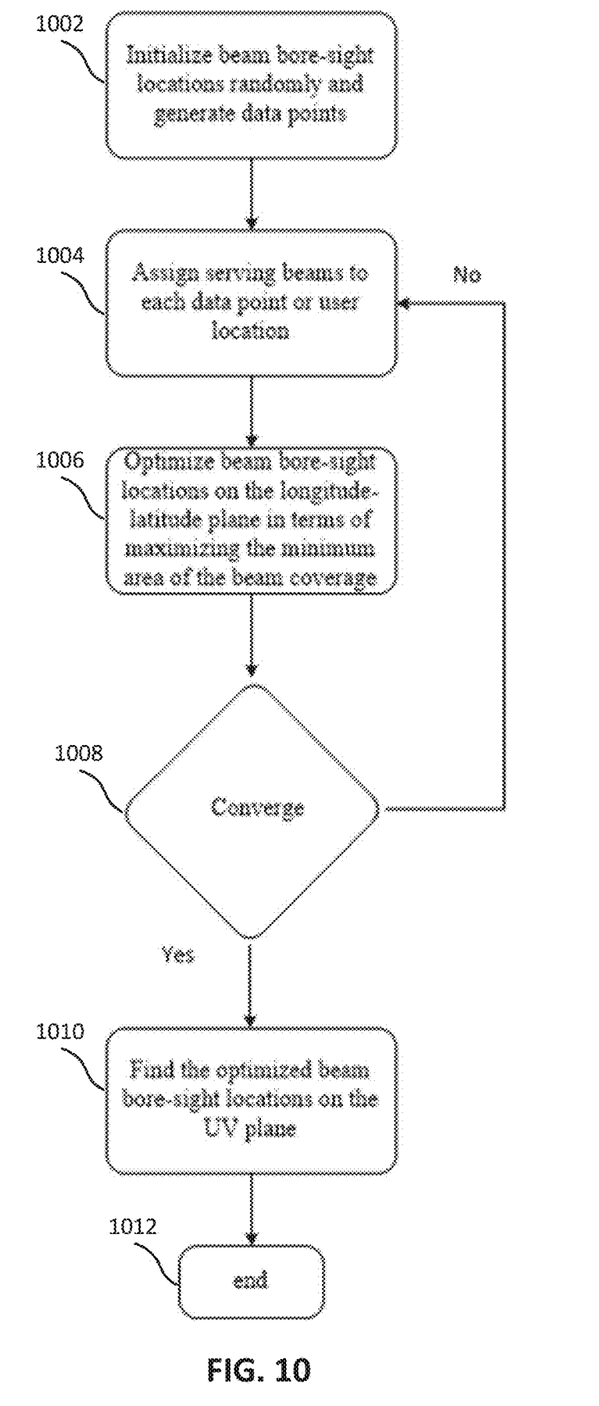
FIG. 10 illustrates a flowchart for optimizing bore-sign locations, according to an embodiment.

FIG. 10 illustrates a flowchart for optimizing bore-sign locations, according to an embodiment. At 1002, the system initializes beam bore-sight locations randomly and generates data points. At 1004, the system assigns serving beams to each data point or user location. At 1006, the system optimizes beam bore-sight locations on the longitude-latitude plane in terms of maximizing the minimum area of the beam coverage. At 1008, the system determines whether convergence has occurred. If convergence has not occurred, the system repeats steps 1004-1008. If the system determines that convergence has occurred, then at 1010, the system finds the optimized beam bore-sight locations on the UV plane. The system then ends the process at 1012.

Figure 11:
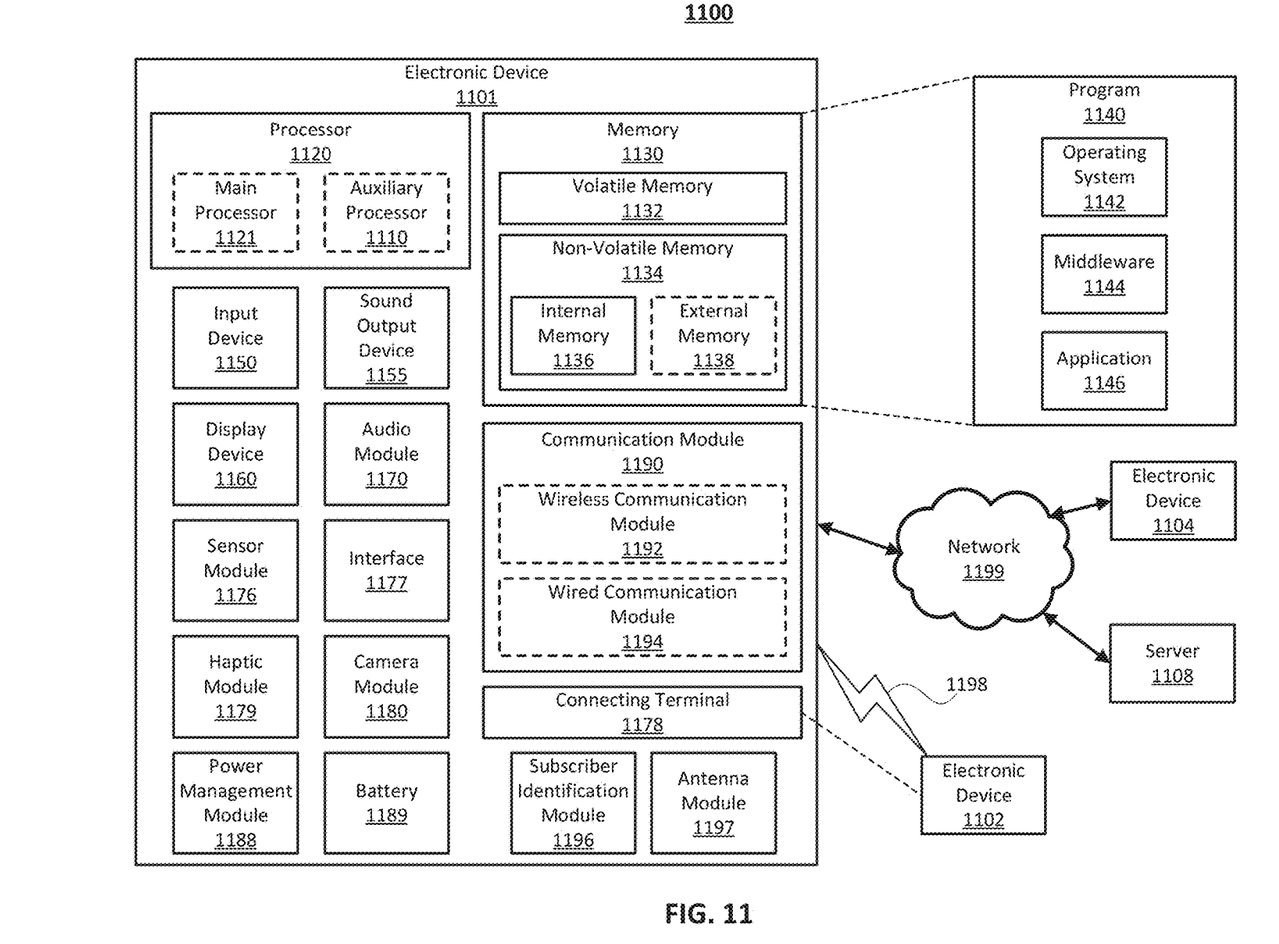
FIG. 11 illustrates a block diagram of an electronic device in a network environment, according to an embodiment.

FIG. 11 illustrates a block diagram of an electronic device 1101 in a network environment 1100, according to one embodiment. Referring to FIG. 11, the electronic device 1101 in the network environment 1100 may communicate with another electronic device 1102 via a first network 1198 (e.g., a short-range wireless communication network), or another electronic device 1104 or a server 1108 via a second network 1199 (e.g., a long-range wireless communication network). The electronic device 1101 may also communicate with the electronic device 1104 via the server 1108. The electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In one embodiment, at least one (e.g., the display device 1160 or the camera module 1180) of the components may be omitted from the electronic device 1101, or one or more other components may be added to the electronic device 1101. In one embodiment, some of the components may be implemented as a single integrated circuit (IC). For example, the sensor module 1176 (e.g., a fingerprint sensor, an iris sensor, or an illuminance sensor) may be embedded in the display device 1160 (e.g., a display).

The processor 1120 may execute, for example, software (e.g., a program 1140) to control at least one other component (e.g., a hardware or a software component) of the electronic device 1101 coupled with the processor 1120, and may perform various data processing or computations. As at least part of the data processing or computations, the processor 1120 may load a command or data received from another component (e.g., the sensor module 1176 or the communication module 1190) in volatile memory 1132, process the command or the data stored in the volatile memory 1132, and store resulting data in non-volatile memory 1134. The processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or execute a particular function. The auxiliary processor 1123 may be implemented as being separate from, or a part of, the main processor 1121.

The auxiliary processor 1123 may control at least some of the functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to one embodiment, the auxiliary processor 1123 (e.g., an ISP or a CP) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, or a keyboard.

The sound output device 1155 may output sound signals to the outside of the electronic device 1101. The sound output device 1155 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to one embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to one embodiment, the audio module 1170 may obtain the sound via the input device 1150, or output the sound via the sound output device 1155 or a headphone of an external electronic device 1102 directly (e.g., wired) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. The sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device 1102 directly (e.g., wired) or wirelessly. According to one embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device 1102. According to one embodiment, the connecting terminal 1178 may include, for example, an HDMI connector, a USB connector, an SD card connector, or an audio connector (e.g., a headphone connector).

The haptic module 1179 may convert an electrical signal into a mechanical stimulus (e.g., a vibration or a movement) or an electrical stimulus which may be recognized by a user via tactile sensation or kinesthetic sensation. According to one embodiment, the haptic module 1179 may include, for example, a motor, a piezoelectric element, or an electrical stimulator.

The camera module 1180 may capture a still image or moving images. According to one embodiment, the camera module 1180 may include one or more lenses, image sensors, ISPs, or flashes.

The power management module 1188 may manage power supplied to the electronic device 1101. The power management module 1188 may be implemented as at least part of, for example, a power management integrated circuit (PMIC).

The battery 1189 may supply power to at least one component of the electronic device 1101. According to one embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more CPs that are operable independently from the processor 1120 (e.g., the AP) and supports a direct (e.g., wired) communication or a wireless communication. According to one embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or a standard of the Infrared Data Association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to one embodiment, the antenna module 1197 may include one or more antennas, and, therefrom, at least one antenna appropriate for a communication scheme used in the communication network, such as the first network 1198 or the second network 1199, may be selected, for example, by the communication module 1190 (e.g., the wireless communication module 1192). The signal or the power may then be transmitted or received between the communication module 1190 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. All or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

One embodiment may be implemented as software (e.g., the program 1140) including one or more instructions that are stored in a storage medium (e.g., internal memory 1136 or external memory 1138) that is readable by a machine (e.g., the electronic device 1101). For example, a processor of the electronic device 1101 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for mitigating inter-satellite interference, comprising:
   modifying a beam bore-sight of a satellite according to a hexagonal mapping that imposes a hexagonal shape boundary within a coverage area of the satellite;
   identifying beams of the satellite positioned outside of the hexagonal shape boundary; and
   reducing power of the beams positioned outside of the hexagonal shape boundary.

2. The method of claim 1, wherein reducing the power of the beams positioned outside of the hexagonal shape boundary further includes disabling the beams positioned outside of the hexagonal shape boundary.

3. The method of claim 2, wherein the beams are disabled according to a hard decision solution.

4. The method of claim 1, wherein reducing the power of the beams positioned outside of the hexagonal shape boundary further includes optimizing the power of the beams positioned outside of the hexagonal shape boundary.

5. The method of claim 4, wherein the power of the beams are optimized such that the power is inversely proportional to a foot print area outside of the hexagonal shape boundary.

6. A system for mitigating inter-satellite interference, comprising:
   at least one satellite;
   a memory; and
   a processor configured to:
      modify a beam bore-sight of the at least one satellite according to a hexagonal mapping that imposes a hexagonal shape boundary within a coverage area of the satellite;
      identify beams of the at least one satellite positioned outside of the hexagonal shape boundary; and
      reduce power of the beams positioned outside of the hexagonal shape boundary.

7. The system of claim 6, wherein the processor is further configured to reduce the power of the beams positioned outside of the hexagonal shape boundary by disabling the beams positioned outside of the hexagonal shape boundary.

8. The system of claim 7, wherein the beams are disabled according to a hard decision solution.

9. The system of claim 6, wherein the processor is further configured to reduce the power of the beams positioned outside of the hexagonal shape boundary by, optimizing the power of the beams positioned outside of the hexagonal shape boundary.

10. The system of claim 9, wherein the power of the beams are optimized such that the power is inversely proportional to a foot print area outside of the hexagonal shape boundary.

11. A method for mitigating inter-satellite interference, comprising:
    initializing beam bore-sight locations of a serving satellite in a coverage area of the serving satellite to generate data points;
    assigning serving beams to the data points;
    detecting interference beams from an interfering satellite at the data points;
    determining a boundary region, for each serving beam, by maximizing a minimum area of serving beam coverage, a beam boundary of the boundary region being where the serving beam and one or more of the interference beams have the same power;
    determining an optimized beam bore-sight location within each boundary region; and
    shifting the initialized beam bore-sight locations to the optimized beam bore-sight locations.

12. The method of claim 11, wherein the optimized beam bore-sight locations are optimized on a longitude-latitude plane in terms of maximizing a signal-to-interference ratio (SIR).

13. The method of claim 11, wherein the beam bore-sight locations are optimized until convergence occurs.

14. The method of claim 11, wherein the optimized beam bore-sight locations are optimized on a longitude-latitude plane in terms maximizing the minimum area of the serving beam coverage.

15. The method of claim 11, wherein the optimized beam bore-sight locations are optimized iteratively using a generalized Lloyd algorithm (GLA) or deterministic annealing (DA).

16. A system for mitigating inter-satellite interference, comprising:
 a serving satellite;
 a memory; and
 a processor configured to:
  initialize beam bore-sight locations of the serving satellite in a coverage area of the serving satellite to generate data points;
  assign serving beams to the data points;
  detect interference beams from an interfering satellite at the data point;
  determine a boundary region, for each serving beam, by maximizing a minimum area of serving beam coverage, a beam boundary of the boundary region being where the serving beam and one or more of the interference beams have the same power;
  determine an optimized beam bore-sight location within each boundary region; and
  shift the initialized beam bore-sight locations to the optimized beam bore-sight locations.

17. The system of claim 16, wherein the processor is further configured to optimize beam bore-sight locations on a longitude-latitude plane in terms of maximizing a signal-to-interference ratio (SIR).

18. The system of claim 16, wherein the beam bore-sight locations are optimized until convergence occurs.

19. The system of claim 16, wherein the processor is further configured to optimize beam bore-sight locations on a longitude-latitude plane in terms maximizing the minimum area of the serving beam coverage.

20. The system of claim 16, wherein the processor is further configured to optimize beam bore-sight locations iteratively using a generalized Lloyd algorithm (GLA) or deterministic annealing (DA).

* * * * *